United States Patent [19]

Ashlock et al.

[11] Patent Number: 4,702,773

[45] Date of Patent: Oct. 27, 1987

[54] TRANSPARENT, ABRASION RESISTANT COATING COMPOSITIONS

[75] Inventors: Lysander T. Ashlock, Riverside; Harold Mukamal, Seal Beach; William H. White, La Puente, all of Calif.

[73] Assignee: Swedlow, Inc., Garden Grove, Calif.

[21] Appl. No.: 829,745

[22] Filed: Feb. 14, 1986

Related U.S. Application Data

[63] Continuation of Ser. No. 364,446, Apr. 1, 1982, Pat. No. 4,571,365, which is a continuation-in-part of Ser. No. 136,757, Apr. 3, 1980, Pat. No. 4,500,669, which is a continuation of Ser. No. 845,915, Oct. 27, 1977, abandoned.

[51] Int. Cl.$^4$ .................... C08K 3/8; C08C 83/06
[52] U.S. Cl. .................... 106/287.12; 106/287.14; 106/287.16; 106/287.24; 428/412
[58] Field of Search ............ 428/412; 106/287.12, 106/287.14

[56] References Cited

U.S. PATENT DOCUMENTS

| | | | |
|---|---|---|---|
| 3,817,905 | 6/1974 | Lerner et al. | 524/780 |
| 3,986,997 | 10/1976 | Clark | 428/412 |
| 4,024,306 | 5/1977 | Takamizawa et al. | 528/23 |
| 4,170,690 | 10/1979 | Armbruster et al. | 428/447 |
| 4,177,315 | 12/1979 | Ubersax | 428/336 |
| 4,188,451 | 2/1980 | Humphrey | 428/331 |
| 4,500,669 | 2/1985 | Ashlock et al. | 106/287.14 |
| 4,571,365 | 2/1986 | Ashlock et al. | 106/287.14 |

*Primary Examiner*—Theodore Morris
*Attorney, Agent, or Firm*—Lyon & Lyon

[57] ABSTRACT

There is disclosed transparent, abrasion resistant coating compositions comprising a colloidal dispersion of a water insoluble dispersant in a water-alcohol solution of the partial condensate of silanol wherein the dispersant comprises metals, alloys, salts, oxides and hydroxides thereof.

37 Claims, No Drawings

4,702,773

TRANSPARENT, ABRASION RESISTANT COATING COMPOSITIONS

CROSS-REFERENCE TO RELATED APPLICATIONS

This application is a continuation of application Ser. No. 364,446, filed Apr. 1, 1982, now U.S. Pat. No. 4,571,365 which application is a continuation-in-part application of Ser. No. 136,757, filed Apr. 3, 1980 now U.S. Pat. No. 4,500,669, which application is a continuation of application Ser. No. 845,915, filed Oct. 27, 1977, now abandoned.

BACKGROUND OF THE INVENTION

The present invention relates to coating compositions and, in particular, relates to protective coating compositions for polymeric materials.

In recent years, synthetic polymeric materials have been utilized in a wide variety of applications. Transparent polymeric materials have been utilized as windows in aircraft and public buildings. Further, transparent polycarbonates and acrylics have been utilized in glazing for automobiles, buses and aircraft. Although these transparent polymers may be readily fabricated into the desired shape, unfortunately they have relatively low abrasion resistance. The prior method of enabling the use of these transparent polymers involves coating the surface of the polymers with a transparent, abrasion resistant coating. Prior coating such as silica-containing solutions and polysilicic acid fluorinated copolymer have been utilized. Unfortunately, these coatings are difficult to apply, have a low humidity resistance or are expensive.

Another prior coating composition is disclosed in the Clark U.S. Pat. No. 3,986,997. The Clark composition comprised a colloidal dispersion of silica in a water-alcohol solution of the partial condensate of silanol. Although the Clark composition is suitable in some applications, in other applications, additional hardness, elongation and static dissipation was desired to enable the formation of a more suitable coating. Thus, a coating having an improved hardness, elongation and static dissipating capability is still desired.

SUMMARY OF THE INVENTION

It is therefore an object of the present invention to provide an improved abrasion resistant coating composition. It is a further object of the present invention to provide a coating composition having improved elongation and static dissipating capabilities.

This and other objects and advantages are obtained by forming a transparent, abrasion resistant coating comprising a colloidal dispersion of a water insoluble dispersant in a water-alcohol solution of the partial condensate of silanol. The insoluble dispersant is preferably a metal, metal alloy, metal salt, metal oxide, or metal hydroxide that can be converted into a colloidal dispersion and is stable in the pH range of about 3 to about 6, with a pH of about 5.5 particularly preferred. The silanol preferably has the formula $R(Si(OH)_3)$ where R is an organic radical such as a lower alkyl or vinyl, methoxyethyl, phenyl, gamma-glycidoxypropyl or gamma-methacryloxypropyl radical. Preferably, the partial condensate contains at least 30% by weight methyl trisilanol, and more preferably at least about 70% by weight of the partial condensate is methyl trisilanol.

A more thorough disclosure of the objects and the advantages of the present invention is presented in the detailed description which follows.

DETAILED DESCRIPTION OF THE INVENTION

The present invention contemplates the formation of a transparent, abrasion resistant coating comprising a colloidal dispersion of a water insoluble dispersant in a water-alcohol solution of the partial condensate of silanol.

The insoluble dispersants are preferably a metal, metal alloy, metal salt, metal oxide, or metal hydroxide which can be dispersed in the water alcohol solution of the partial condensate of silanol to form a colloidal dispersion. Suitable metals are antimony, aluminum, gold, silver, copper, tin, cadmium, and indium. Suitable alloys are mixtures of the above metals such as tin-antimony, tin-indium and tin-cadmium alloys. Suitable metal salts, metal oxides and metal hydroxides are oxides, nitrides, phosphates, sulfides, hydroxides, chlorides, sulfates or acetates of the above metals and alloys such as antimony oxide, aluminum oxide, aluminum acetate, tin-antimony oxides, cadmium stannate and indium-tin oxide. However, it will be obvious to one skilled in the art that other water insoluble metals, metal alloys, metal salts, metal oxides and metal hydroxides which can be dispersed in a water-alcohol solution of the partial condensate of silanol to form a colloidal dispersion, are stable in the pH range of about 3 to about 6, and do not alter the silicone cure reaction or coating stability would also be suitable in the practice of the present invention.

In some cases, the dispersants of the present invention may be opaque. Suitable opaque dispersants preferably have a particle size small enough to avoid appreciable scattering of visible light thereby preventing the formation of a translucent or pigmented coating. Preferably, if the dispersant has a refractive index of about 1.5, the average colloidal particle size should be about 200 angstroms, whereas if the refractive index is 2.0 or greater, the average colloidal particle size should be about 100 angstroms or less. Particle sizes of less than 100 angstroms and especially from about 14 to about 20 millimicrons, are particularly preferred for superior optical clarity.

The colloidal dispersants function to improve the hardness and the elongation properties of the coating. Further, certain colloidal metals, metal alloys, metal salts, metal oxides and metal hydroxides such as copper, gold, silver, tin-antimony oxides, cadmium stannate and indium tin oxide also provided improved static dissipating properties.

The partial condensate preferably comprises trisilanols having the formula $R(Si(OH)_3)$ wherein R is a low molecular weight, short chain organic radical and is preferably selected from the group of radicals consisting of lower alkyl or vinyl $C_1$-$C_4$, methoxyethyl, phenyl, gamma-glycidoxypropyl or gamma-methacryloxypropyl. The organic radical functions to enable the formation of the polymeric coating. However, larger organic radicals hinder the crosslinking of the silanol and result in a softer coating. The partial condensate is preferably comprised of at least about 30% by weight methyl trisilanol, and more preferably at least about 70% by weight methyl trisilanol. In particularly preferred coating compositions, the partial condensate is comprised of 100% methyl trisilanol.

The partial condensate may also comprise mixtures of trisilanols and disilanols. The partial condensate comprising a mixture of tri and disilanols forms coatings having increased flexibility and decreased hardness. Therefore, it is preferred that the mixture comprise at least about 80% by weight of the trisilanol to form a coating having a suitable hardness.

The silanols are preferably generated in situ by the hydrolysis of the corresponding alkoxysilane in an aqueous dispersion of the insoluble dispersant. Suitable alkoxysilanes have alkoxy substituents such as methoxy, ethoxy, isopropoxy, methoxyethoxy, t-butoxy and acetoxy which, upon the hydrolysis of the silane, form the corresponding alcohol or acid. Upon the formation of the silanol in the acidic aqueous medium, a portion of the silicon-bonded hydroxyl groups of the silanol are condensed to form silicon-oxygen-silicon bonds. However, the silanol is only partially condensed and retains a portion of the silicon-bonded hydroxyl groups to render the polymer soluble in the water-alcohol solvent. The partial condensate can be characterized as having at least one silicon-bonded hydroxyl group for every three silicon-oxygen-silicon bonds. When the coating is cured, the remaining hydroxyl groups condense to form a selsesqufoxane, $RSiO_{3/2}$.

The coating compostion of the present invention is preferably prepared by dispersing the dispersant in an aqueous or aqueous-alcohol solution to form a hydrosol. Suitable alcohols are lower aliphatic alcohols such as methanol, ethanol, propanol, isopropanol, isobutanol and n-butanol. However, it will be obvious to one skilled in the art that other alcohols may also be utilized in the practice of the present invention. The hydrosol is then added to a solution of the alkoxysilane in acid. The solution of alkoxysilane contains a sufficient amount of acid so that the resulting mixture preferably has a pH from about 3 to about 6. At lower or higher pH, the dispersant tends to precipitate out from solution. A pH of about 4 to about 6, and especially about 5.5, is particularly preferred to provide a longer stable shelf life. The acid is preferably an organic acid such as acetic, chloroacetic, formic, and dimethyl-malonic because they evaporate readily when the coating is dried and they enhance adhesion of the coating to the substrate. Other suitable organic and inorganic acids are disclosed in the Clark U.S. patent, supra, the disclosure of which is incorporated herein by reference.

In a short time after the hydrosol and alkoxysilane solution are mixed together, substantially all of the alkoxysilane is hydrolyzed to form the corresponding silanol and alcohol. A portion of the silanol is then condensed to form the partial condensate. It is preferred that the mixture contain enough alcohol to form a water-alcohol co-solvent system having from about 20% to about 75% by weight alcohol to insure the solubility of the partial condensate. Additional alcohol or another polar solvent such as acetone may be added to the mixture to form a suitable solvent system.

Preferably, the coating composition contains from about 10% to about 50% solids, and the solids consist of about 5% to about 70% of the colloidal dispersant and about 30% to about 95% of the partial condensate. Particularly preferred compositions contain about 16% solids of which about 10-20% by weight is the colloidal dispersant. However, it will be appreciated that the amount of solids in the coating and the composition of the solids may vary over a wide range depending upon the desired properties of the cured coating for particular applications.

Preferably, a latent condensation catalyst is added to the coating composition to enable curing of the coating composition under milder conditions to form the hard, abrasion resistant coating. Preferably a sufficient amount of the catalyst is added to the composition to comprise at least about 0.1% to about 4% by weight of the composition, and more preferably about 3% by weight of the composition. Suitable condensation catalysts for the present invention are choline acetate and sodium acetate. Other suitable condensation catalysts are disclosed in the Clark patent.

The coating composition of the present invention has a stable shelf life of about six months to one year. The composition can be readily applied to a variety of substrates such as glass, polycarbonates, acrylics, etc. and some metals, such as brass, by methods well known to the art skilled such as flow, spray or dip coating. Then the coating composition is cured at temperatures of about 65° to about 130° C. depending on the stability of the substrate for a period of time from about 1 to about 24 hours depending on the temperature to complete the condensation reaction and form the transparent abrasion-resistant coating of the present invention. The coating preferably has a thickness of about 1 to about 20 microns, with about 3 to 12 microns particularly preferred.

The following examples illustrate the present invention. The physical properties of the coating compositions of the present invention were compared to the physical properties of a coating formed according to the teachings of the Clark patent. The compositions of the present invention were formed as follows:

COMPOSITION I

An antimony-oxide colloidal dispersion in methyl silanol was made by reacting 18.0 grams of the oxide dispersion with a mixture of 18.0 grams of trimethoxy methyl silane and 1.3 grams of glacial acetic acid. The temperature was maintained from about 0° C. to 10° C. 31.6 grams of 2-propanol was then added to the solution. The mixture was allowed to digest for a period of about 48 hours and then 16.9 grams of 2-propanol, 12.6 grams of butanol and 0.9 grams of a 10% choline acetate solution in 2-propanol was added to the mixture. The mixture was then filtered and coated onto an acrylic substrate by flow film application. The coating was then dried to a tackfree condition at about 40% humidity at about 20° C. and cured at about 85° C. to 95° C. for about two hours.

COMPOSITION II

A dispersion comprising 208 grams of basic aluminum acetate in 312 grams distilled water was added to 200 grams of isopropyl alcohol with constant stirring at a temperature of about 5° C. to 10° C. Then, 250 grams of methyl trimethoxy silane was added slowly with stirring to the mixture while maintaining the reaction temperature. After one hour of stirring, 142 grams of isopropyl alcohol and 0.9 grams of a 10% choline acetate solution in 2-propanol was added to the mixture and the mixture was stirred for another hour. The product was filtered through a 1.2 micron filter using diatomaceous earth as a filtering aid. The composition was coated on acrylic as 26% solid by flow film application. The coating was then dried to a tack free condition at about 40% humidity at about 20° C. and cured for the four hours at 87° C.

The coated parts were tested for light transmission and haze using ASTM C-1003; taber abrasion using ASTM D-1044 (500 gms, 100 rev.), and adhesion and Elongation-Flexibility as follows:

Adhesion: Cross-hatch scribes are made on the surface of samples of the coated parts and 3M-60 cellophane tape is then affixed to the surface. The tape is then pulled away from the surface to remove the coating. The number of unaffected squares determines the percentage of adhesion of the coating to the substrate.

Elongation-Flexibility

Samples of the coated material having dimensions of one inch by ten inches are wrapped around mandrels having decreasing diameters from 84 inches to 8 inches. Each sample is then inspected with high-intensity lamps to determine coating failure as evidenced by perpendicular cracking across the coating. The Percent Elongation is then calculated as follows:

$$E = \frac{100 \times \frac{T}{2}}{R}$$

$T$ = thickness of sample
$R$ = radium of mandrel at which coating failed.

The original results of the test are as follows, although a question may exist as to their reproducibility. In addition, it will also be recognized by those skilled in the art that exact duplication of such test results may be difficult as reproducibility is affected by subtle changes in raw materials, processing techniques, environmental conditions, and testing variables.

TABLE I

|  | Clark Coating | Composition I | Composition II |
|---|---|---|---|
| Light Transmission, % | 93.9 | 92.0 | 93.2 |
| Haze, % | 0.2 | 0.08 | 0.25 |
| Taber Abrasion, % delta haze | 2.5 | 0.7 | 1.0 |
| Flexed Elongation | 1.0 | 1.5 | 1.0 |
| Adhesion % | 100 | 100 | 100 |

From the above data, it can be seen that the coating composition of the present invention exhibits improved taber abrasion resistance and elongation. Further, the coating exhibits suitable adhesion to the substrates.

Additional coating compositions of the present invention containing various weight percentages of colloidal antimony oxide were prepared to test the effect of the percentage of the metal oxide colloidal dispersant upon the final coating performance. The coating compositions were prepared by blending the colloidal antimony oxide dispersion (Nyacol A-1550 from Nyacol, Inc., Megunco Road, Ashland, Mass. 01721) containing 50% solids with the water and with approximately 25% by weight of the glacial acetic acid, and cooling the solution to about 35° F. Methyl trimethoxy silane and the remainder of the glacial acetic acid were blended together, and this mixture was then added slowly with vigorous agitation to the solution containing the colloidal antimony oxide dispersant while maintaining the temperature between 35°-45° F. Stirring was continued until no odor of residual silane was detectable, and the blends were then stored at about 45° F. for about 24 hours. The alcohol and latent condensation catalyst were subsequently added to the final solution to obtain 16 percent total solids with 3 percent catalyst based upon the weight of the solids. The coating solutions were filtered, and then flow-coated onto cast acrylic sheets, air-dried for approximately 20 minutes at ambient temperature and then cured at 200° F. for 2 hours. The coated acrylic samples were then evaluated for adhesion and abrasion resistance at the same time and under the same conditions with the following results:

TABLE II

|  | A | B | C | D | E | F |
|---|---|---|---|---|---|---|
| Methyl trimethoxy silane, grams | 406 | 386 | 366 | 345 | 325 | 284 |
| glacial acetic acid, grams | 32 | 32 | 32 | 32 | 32 | 32 |
| Nyacol A-1550, grams | — | 20 | 40 | 60 | 80 | 120 |
| Water, grams | 242 | 220 | 198 | 176 | 153 | 109 |
| Isopropanol, grams | 369 | 391 | 413 | 436 | 459 | 504 |
| Butanol, grams | 141 | 141 | 141 | 141 | 141 | 141 |
| Choline acetate, grams (10% in isopropanol), | 60 | 60 | 60 | 60 | 60 | 60 |
| ratio antimony oxide/siloxane, | 0/100 | 5/95 | 10/90 | 15/85 | 20/80 | 30/70 |
| wt % Ant. Oxide | 0 | 5 | 10 | 15 | 20 | 30 |
| % adhesion | 100 | 100 | 100 | 100 | 100 | 100 |
| Taber Abrasion Resistance, Haze after 500 rev. | 20.1 | 18.8 | 13.1 | 11.8 | 14.1 | 17.7 |

As shown in the above Table II, the incorporation of the colloidal antimony oxide particles significantly reduced the degree of abrasion, with coating compositions containing 10–20 weight percent antimony oxide having particularly improved abrasion resistance over the unfilled composition.

While embodiments and applications of this invention have been shown and described, it will be apparent to those skilled in the art that many more modifications are possible without departing from the inventive concepts herein described. The invention, therefore, is not to be restricted except as is necessary by the prior art and by the spirit of the appended claims.

What is claimed is:

1. A coating composition which forms a transparent, abrasion-resistant coating upon curing, said coating composition containing an effective abrasion resisting amount of a colloidal dispersion of a water insoluble dispersant in a water-alcohol solution of the partial condensate of R(Si(OH)$_3$) wherein R is an organic radical, and said dispersant is a metal salt wherein the metal is selected from the group consisting of antimony, aluminum, gold, silver, copper, tin, cadmium, indium and mixtures thereof.

2. A coating composition which forms a transparent, abrasion-resistant coating upon curing, said coating composition containing an effective abrasion resisting amount of a colloidal dispersion of a water insoluble dispersant in a water-alcohol solution of the partial condensate comprising a mixture of R(Si(OH)$_3$) and R$_2$(Si(OH)$_2$) wherein R is an organic radical, said condensate containing at least about 80 percent by weight R(Si(OH)$_3$), and said dispersant is a metal salt wherein the metal is selected from the group consisting of antimony, aluminum, gold, silver, copper, tin, cadmium, indium and mixtures thereof.

3. The coating composition of claim 1 or 2 wherein said metal salts are selected from the group consisting of nitrides, phosphates, sulfides, and acetates.

4. The coating compositions of claim 1 or 2 wherein said metal salts are chlorides or sulfates.

5. The coating composition of claims 1 or 2, wherein said dispersant is aluminum acetate.

6. The coating composition of claim 1 or 2 wherein said organic radical is selected from the group consisting of $C_1$-$C_4$ alkyl and vinyl, methoxyethyl, gamma-glycidoxypropyl and gamma-methacryloxypropyl.

7. The coating composition of claim 1 or 2 wherein said partial condensate contains at least 70 percent by weight methyl trisilanol.

8. The coating composition of claim 1 or 2 wherein said composition contains sufficient acid to provide a pH in the range of about 4 to about 6.

9. The coating composition of claim 8 wherein said acid is acetic acid.

10. The coating composition of claim 1 or 2 wherein said composition contains from about 10 percent to about 50 percent solids.

11. The coating composition of claim 10 wherein about 5 percent to about 70 percent of said solids is the colloidal dispersant.

12. The coating composition of claim 1 or 2 wherein said composition additionally includes a latent condensation catalyst.

13. The coating composition of claim 12 wherein said catalyst is choline acetate.

14. The coating composition of claim 1 or 2 wherein the alcohol in the water-alcohol solution is a lower aliphatic alcohol.

15. The coating composition of claim 1 or 2 wherein the alcohol comprises about 20 to about 75 weight percent of the water-alcohol solution.

16. A coating composition which forms a transparent, abrasion-resistant coating upon curing, said coating composition containing an effective abrasion resisting amount of a colloidal dispersion of a water insoluble dispersant in a water-alcohol solution of the partial condensate of $R(Si(OH)_3)$ wherein R is an organic radical, and said dispersant is a metal oxide wherein the metal is selected from the group consisting of antimony, aluminum, gold, silver, copper, tin, cadmium, indium and mixtures thereof.

17. A coating composition which forms a transparent, abrasion-resistant coating upon curing, said coating composition containing an effective abrasion resisting amount of a colloidal dispersion of a water insoluble dispersant in a water-alcohol solution of the partial condensate comprising a mixture of $R(Si(OH)_3)$ and $R_2(Si(OH)_2)$ wherein R is an organic radical, and condensate containing at least about 80 percent by weight $R(Si(OH)_3)$, and said dispersant is a metal oxide wherein the metal is selected from the group consisting of antimony, aluminum, gold, silver, copper, tin, cadmium, indium and mixtures thereof.

18. The coating composition of claim 16 or 17 wherein said dispersant is antimony oxide.

19. The coating composition of claim 16 or 17 wherein said dispersant is aluminum oxide.

20. The coating composition of claim 16 or 17 wherein said organic radical is selected from the group consisting of $C_1$-$C_4$ alkyl and vinyl, methoxyethyl, gamma-glycidoxypropyl and gamma-methacryloxypropyl.

21. The coating composition of claim 16 or 17 wherein said partial condensate contains at least 70 percent by weight methyl trisilanol.

22. The coating composition of claim 16 or 17 wherein said composition contains sufficient acid to provide a pH in the range of about 4 to about 6.

23. The coating composition of claim 22 wherein said acid is acetic acid.

24. The coating composition of claim 16 or 17 wherein said composition contains from about 10 percent to about 50 percent solids.

25. The coating composition of claim 24 wherein about 5 percent to about 70 percent of said solids is the colloidal dispersant.

26. The coating composition of claim 16 or 17 wherein said composition additionally includes a latent condensation catalyst.

27. The coating composition of claim 26 wherein said catalyst is choline acetate.

28. The coating composition of claim 16 or 17 wherein the alcohol in the water-alcohol solution is a lower aliphatic alcohol.

29. The coating composition of claim 16 or 17 wherein the alcohol comprises about 20 to about 75 weight percent of the water-alcohol solution.

30. A coating composition which forms a transparent, abrasion-resistant coating upon curing, said coating composition containing an effective abrasion resisting amount of a colloidal dispersion of a water insoluble dispersant in a water-alcohol solution of the partial condensate of $R(Si(OH)_3)$ wherein R is an organic radical, and said dispersant is a metal hydroxide wherein the metal is selected from the group consisting of antimony, aluminum, gold, silver, copper, tin, cadmium, indium and mixtures thereof.

31. A coating composition which forms a transparent, abrasion-resistant coating upon curing, said coating composition containing about 10% to 20% by weight of a colloidal dispersion of antimony oxide in a water-alcohol solution of a partial condensate containing at least 70% by weight methyl trisilanol.

32. A coating composition which forms a transparent, abrasion-resistant coating upon curing, said coating composition containing an effective abrasion resisting amount of a colloidal dispersion of a water insoluble dispersant in a water-alcohol solution of the partial condensate of $R(Si(OH)_3)$ wherein R is an organic radical, and said dispersant is a metal salt which can be dispersed in the water-alcohol solution of the partial condensate of $R(Si(OH)_3)$ to form a colloidal dispersion, is stable in the pH range of about 3 to about 6, and does not alter the silicone cure reaction or coating stability.

33. A coating composition which forms a transparent, abrasion-resistant coating upon curing, said coating composition containing an effective abrasion resisting amount of a colloidal dispersion of a water insoluble dispersant in a water-alcohol solution of the partial condensate comprising a mixture of $R(Si(OH)_3)$ and $R_2(Si(OH)_2)$ wherein R is an organic radical, said condensate containing at least about 80 percent by weight $R(Si(OH)_3)$, and said dispersant is a metal salt which can be dispersed in the water-alcohol solution of the partial condensate of $R(Si(OH)_3)$ to form a colloidal dispersion, is stable in the pH range of about 3 to about 6, and does not alter the silicone cure reaction or coating stability.

34. A coating composition which forms a transparent, abrasion-resistant coating upon curing, said coating composition containing an effective abrasion resisting amount of a colloidal dispersion of a water insoluble dispersant in a water-alcohol solution of the partial condensate of $R(Si(OH)_3)$ wherein R is an organic radical, and said dispersant is a metal oxide which can be dispersed in the water-alcohol solution of the partial condensate of $R(Si(OH)_3)$ to form a colloidal dispersion, is stable in the pH range of about 3 to about 6, and does not alter the silicone cure reaction or coating stability.

35. A coating composition which forms a transparent, abrasion-resistant coating upon curing, said coating composition containing an effective abrasion resisting amount of a colloidal dispersion of a water insoluble dispersant in a water-alcohol solution of the partial condensate comprising a mixture of $R(Si(OH)_3)$ and $R_2(Si(OH)_2)$ wherein R is an organic radical, and condensate containing at least about 80 percent by weight $R(Si(OH)_3)$, and said dispersant is a metal oxide which can be dispersed in the water-alcohol solution of the partial condensate of $R(Si(OH)_3)$ to form a colloidal dispersion, is stable in the pH range of about 3 to about 6, and does not alter the silicone cure reaction or coating stability.

36. A coating composition which forms a transparent, abrasion-resistant coating upon curing, said coating composition containing an effective abrasion resisting amount of a colloidal dispersion of a water insoluble dispersant in a water-alcohol solution of the partial condensate of $R(Si(OH)_3)$ wherein R is an organic radical, and said dispersant is a metal hydroxide which can be dispersed in the water-alcohol solution of the partial condensate of $R(Si(OH)_3)$ to form a colloidal dispersion, is stable in the pH range of about 3 to about 6, and does not alter the silicone cure reaction or coating stability.

37. A coating composition of any one of claims 32-36, inclusive, in which said dispersant is present in an amount of at least about 0.5% by weight, based on the total weight of solids in said composition.

* * * * *

REEXAMINATION CERTIFICATE (2579th)
United States Patent [19]
Ashlock et al.

[11] B1 4,702,773
[45] Certificate Issued  May 16, 1995

[54] TRANSPARENT, ABRASION RESISTANT COATING COMPOSITIONS

[75] Inventors: Lysander T. Ashlock, Riverside; Harold Mukamal, Seal Beach; William H. White, La Puente, all of Calif.

[73] Assignee: Pilkington Aerospace Inc.

Reexamination Request:
No. 90/002,986, Mar. 15, 1993

Reexamination Certificate for:
Patent No.: 4,702,773
Issued: Oct. 27, 1987
Appl. No.: 829,745
Filed: Feb. 14, 1986

Related U.S. Application Data

[63] Continuation of Ser. No. 364,446, Apr. 1, 1982, Pat. No. 4,571,365, which is a continuation-in-part of Ser. No. 136,757, Apr. 3, 1980, Pat. No. 4,500,669, which is a continuation-in-part of Ser. No. 845,915, Oct. 27, 1977, abandoned.

[51] Int. Cl.$^6$ ............................ C08K 3/8; C08C 83/06
[52] U.S. Cl. ........................... 106/287.12; 106/287.14; 106/287.16; 106/287.24; 428/412
[58] Field of Search ................... 428/412; 106/287.12, 106/287.14, 287.16, 287.24

[56] References Cited

U.S. PATENT DOCUMENTS

| | | |
|---|---|---|
| 3,412,063 | 1/1968 | Jarboe et al. . |
| 3,718,584 | 2/1973 | Beste et al. . |
| 3,751,326 | 8/1973 | Marks . |
| 3,766,065 | 10/1973 | Chay et al. . |
| 3,860,523 | 10/1973 | Petrow et al. . |
| 3,986,997 | 10/1976 | Clark . |
| 4,049,861 | 9/1977 | Nozari . |
| 4,390,373 | 6/1983 | White et al. . |

FOREIGN PATENT DOCUMENTS

| | | |
|---|---|---|
| 51-42752 | 4/1976 | Japan . |
| 56-99236 | 8/1981 | Japan . |
| 3-217230 | 9/1981 | Japan . |
| 61-54331 | 11/1986 | Japan . |
| 63-305175 | 12/1988 | Japan . |
| 2-245078 | 9/1990 | Japan . |
| 3-172369 | 7/1991 | Japan . |
| 4-4273 | 1/1992 | Japan . |

OTHER PUBLICATIONS

"Physics of Thin Films", by George Hass, et al., vol. 5, 1969 (no month avail.).
"Handbook of Chemistry and Physics", by Robert C. Weast, 51st Edition 1970–1971 (no month avail.).

Primary Examiner—David M. Brunsman

[57] ABSTRACT

There is disclosed transparent, abrasion resistant coating composition comprising a colloidal dispersion of a water insoluble dispersant in a water-alcohol solution of the partial condensate of silanol wherein the dispersant comprises metals, alloys, salts, oxides and hydroxides thereof.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–15, 30, 32, 33 and 36 is confirmed.

Claims 16–29, 31, 34 and 35 are cancelled.

Claim 37 is determined to be patentable as amended.

37. A coating composition of any one of claims [32–36] *32, 33 and 36*, inclusive, in which said dispersant is present in an amount of at least about 0.5% by weight, based on the total weight of solids in said composition.

* * * * *